United States Patent
Thrash et al.

(10) Patent No.: US 7,413,695 B2
(45) Date of Patent: Aug. 19, 2008

(54) RESIN INFUSION MOLD TOOL SYSTEM AND VACUUM ASSISTED RESIN TRANSFER MOLDING WITH SUBSEQUENT PRESSURE BLEED

(75) Inventors: Patrick J. Thrash, Huntington Beach, CA (US); Roger Alan Burgess, Long Beach, CA (US); Alan M. Markus, Lake Forest, CA (US)

(73) Assignee: The Boeing Company, Seattle, WA (US)

( * ) Notice: Subject to any disclaimer, the term of this patent is extended or adjusted under 35 U.S.C. 154(b) by 564 days.

(21) Appl. No.: 10/752,831

(22) Filed: Jan. 7, 2004

(65) Prior Publication Data

US 2004/0135294 A1    Jul. 15, 2004

Related U.S. Application Data

(62) Division of application No. 09/878,825, filed on Jun. 11, 2001, now Pat. No. 6,840,750.

(51) Int. Cl.
*B29C 43/12* (2006.01)
*B29C 43/18* (2006.01)
*B29C 70/36* (2006.01)
*B29C 33/42* (2006.01)

(52) U.S. Cl. .................... 264/257; 264/316; 264/328.2; 264/275; 425/129.1

(58) Field of Classification Search ......... 264/510–511, 264/102, 257–258, 324, 316, 328.2, 275; 425/129.1
See application file for complete search history.

(56) References Cited

U.S. PATENT DOCUMENTS

| | | | |
|---|---|---|---|
| 2,913,036 A | 11/1959 | Smith | |
| 4,311,661 A | 1/1982 | Palmer | |
| 4,312,829 A | 1/1982 | Fourcher | |
| 4,873,044 A | 10/1989 | Epel | |
| 4,882,118 A | 11/1989 | Megarry | |
| 4,902,215 A | 2/1990 | Seemann, III | |
| 4,942,013 A | 7/1990 | Palmer et al. | |
| 5,015,168 A | 5/1991 | Boime et al. | |
| 5,052,906 A | 10/1991 | Seemann | |
| 5,152,949 A | 10/1992 | Leoni et al. | |
| 5,382,150 A | 1/1995 | Henrio | |
| 5,441,692 A | 8/1995 | Taricco | |
| 5,464,337 A | 11/1995 | Bernardon et al. | |
| 5,576,030 A | 11/1996 | Hooper | |
| 5,588,392 A | 12/1996 | Bailey | |
| 5,593,633 A | 1/1997 | Dull et al. | |
| 5,601,852 A | 2/1997 | Seemann | |
| 5,709,893 A | 1/1998 | McCarville et al. | |
| 5,766,539 A | 6/1998 | Fujita et al. | |
| 5,820,894 A | 10/1998 | Kreutzer | |
| 5,863,452 A * | 1/1999 | Harshberger, Jr. et al. ..... 249/83 |
| 5,902,535 A | 5/1999 | Burgess et al. | |
| 6,017,484 A | 1/2000 | Hale | |

(Continued)

*Primary Examiner*—Matthew J. Daniels
(74) *Attorney, Agent, or Firm*—Alston & Bird LLP

(57) ABSTRACT

A resin infusion mold tool system for use in a vacuum assisted resin transfer molding process with a subsequent pressure bleed step. The mold tool system includes a mold assembly having an outer mold line tool connected to resin supply lines and supplying resin to the preform. A plurality of inner mold line tools form a hard interface with the inner mold line of the fiber preform and are held to within tight tolerances by an external locating fixture. Excess resin is drawn out of the fiber preform using a vacuum bag connected to vacuum lines and disposed over the inner mold line tools but not between the tools and the fiber preform. The mold assembly is placed in an autoclave, the resin supply lines are detached and the autoclave pressurized to bleed additional resin out of the preform to raise the fiber volume of the composite structure.

12 Claims, 4 Drawing Sheets

U.S. PATENT DOCUMENTS

| | | |
|---|---|---|
| 6,245,275 B1 | 6/2001 | Holsinger |
| 6,257,858 B1 | 7/2001 | Pabsch et al. |
| 6,374,570 B1 | 4/2002 | McKague, Jr. |
| 6,391,246 B2 | 5/2002 | Shiraishi et al. |
| 6,555,045 B2 | 4/2003 | McClure et al. |
| 2002/0022422 A1 * | 2/2002 | Waldrop, III et al. ........ 442/179 |

* cited by examiner

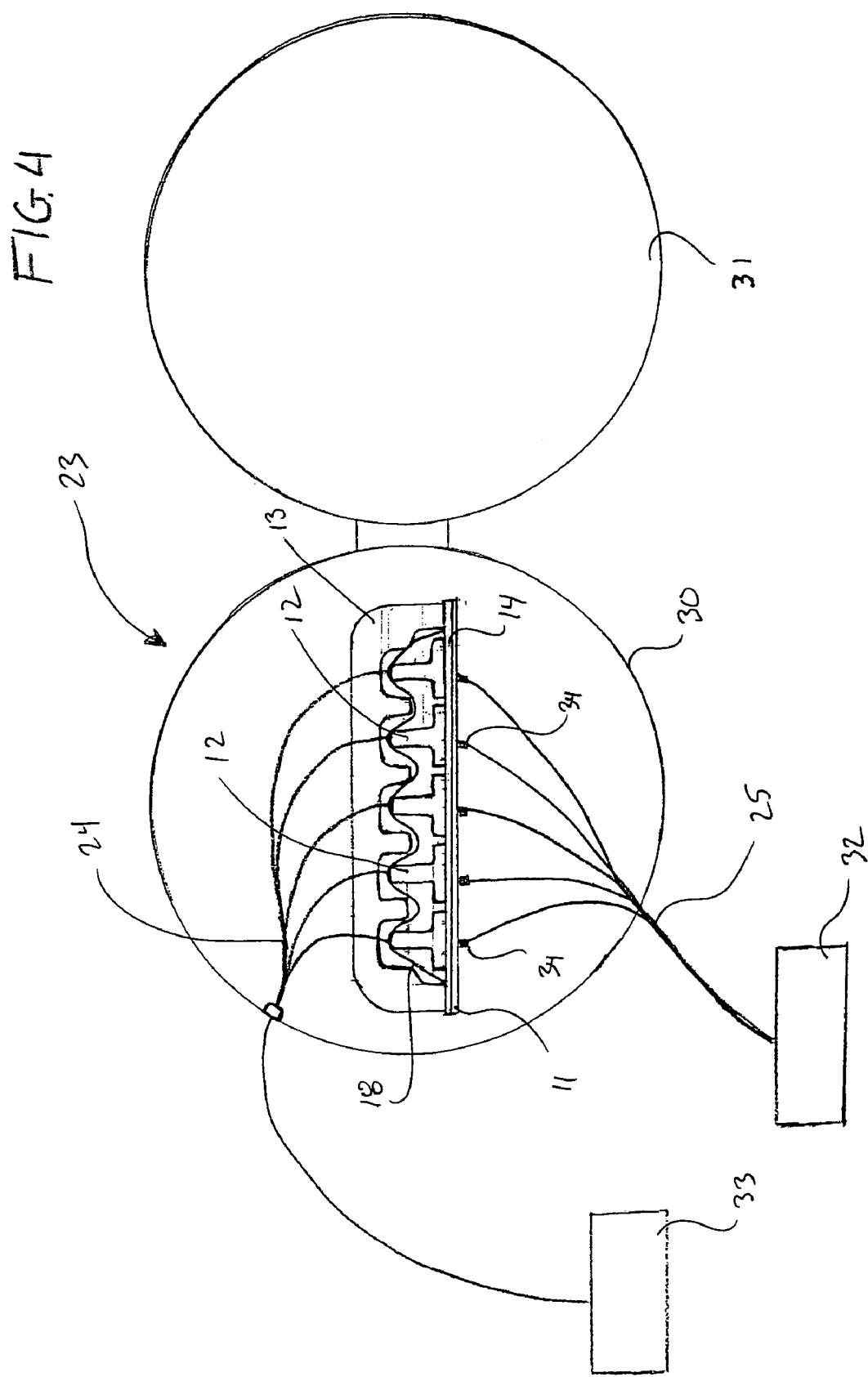

RESIN INFUSION MOLD TOOL SYSTEM AND VACUUM ASSISTED RESIN TRANSFER MOLDING WITH SUBSEQUENT PRESSURE BLEED

CROSS-REFERENCE TO RELATED APPLICATIONS

This is a divisional of U.S. application Ser. No. 09/878,825, filed Jun. 11, 2001, now U.S. Pat. No. 6,840,750, which is hereby incorporated herein in its entirety by reference.

FEDERALLY SPONSORED RESEARCH OR DEVELOPMENT

The United States Government may have rights in this invention as provided by the terms of Contract No. NAS 1-20546 awarded by the National Aeronautics and Space Administration.

FIELD OF THE INVENTION

The present invention relates to the fabrication of composite structures, in particular the fabrication of composite structures using a tool assembly to support a dry fiber preform and vacuum assisted resin transfer molding to infuse resin into the dry fiber preform.

BACKGROUND OF THE INVENTION

The production of large and complex fiber composite structures, such as airplane wings, requires critically dimensioned features to be held within narrow tolerances. Until recently, process for the production of large and complex fiber composite structures did not exist. Large and complex structures had to be broken down into multiple pieces of a more simple design. Each piece was produced individually and then assembled to create the larger structure in a labor-intensive and costly process.

The development of resin film infusion (RFI) methods and the mold tooling used with RFI methods, as demonstrated in U.S. Pat. No. 5,902,535 to Burgess et al., has allowed the production of composite structures up to 70 feet in length. The RFI process involves placing a resin film directly in between, and in contact with, the dry fiber preform and the mold tooling. The mold tooling, resin film and dry fiber preform are then vacuum bagged and inserted into an autoclave. As the temperature and pressure in the autoclave are increased, the resin film melts and is infused through the preform. Large displacements of the mold tooling and fiber perform are not uncommon when thick resin films are used in the RFI process. Large displacements of the mold tooling and the fiber perform can adversely affect the dimensional tolerances of the resulting composite structure.

Vacuum assisted resin transfer molding (VARTM) has also grown over the past few years to include the fabrication of large composite structures for the marine industry, as well as secondary structures for military aircraft, such as engine inlet ducts. In VARTM the liquid resin is infused into the preform by pulling a vacuum on the mold tool. The liquid resin is introduced to the preform with inlet tubes and a manifold system located on the outer surface of the preform. The liquid resin is drawn through the preform via the vacuum pressure. In VARTM, the mold tool requires only slight movement to compensate for bulk reduction in the preform as the vacuum is applied.

Many VARTM structures, however, fail to meet the more stringent structural criteria required for primary structures in aircraft. Primary aircraft structures must have a fiber volume fraction in the range of 57% to 60%. Fiber preforms with thick cross-sections, typical of aircraft primary structures, require significant force application to remove bulk and raise fiber volume fractions to acceptable levels. The fiber volume of thick structures is typically less than 54% due to the relatively low pressure vacuum provided during the VARTM process. In addition, parts made with VARTM are typically relatively simple in design and have a minimal amount of integral structure. The inner mold line is shaped using a soft rubber or nylon vacuum bag, with very little being done to hold the critical dimensions on the mold line surface.

As an alternative approach, U.S. Pat. No. 5,441,692 to Taricco discloses a process for performing VARTM in an autoclave on simple composite structures. The pressure of the inner chamber of the autoclave is reduced concurrent with the reduction of pressure within the VARTM tooling. A reduction of pressure in the autoclave results in zero net pressure across the tooling, significantly reducing the stresses on the tooling. A reduction in the stresses on the tooling allows the tool and cover to be constructed with relatively thin walls, which reduces the weight and thermal capacitance of the tooling. Reducing the weight of the tooling allows for easier handling of the tooling. Also, reduction of the thermal capacitance of the tool reduces the time needed to heat and cool the tool and composite structure.

U.S. Pat. No. 5,015,168 to Boime et al. discloses tooling for use in VARTM that forms a somewhat more complex composite panel that includes a row of panel stiffeners. The tooling includes a block, a sealing bag and calibration parts. The peripheral edge of the bag is connected to the block by a sealing bead and defines a tight volume. The panel is placed in the tight volume between the bag and the block. The calibration parts are placed outside the volume, above the bag and between the panel stiffeners to ensure maintenance of the geometry of the stiffeners during resin transfer. Despite the improvement in structural complexity of the resulting composite part, the use of soft tooling limits the precision to which details can be produced on the part using the process of Biome et al.

Notwithstanding the prior techniques for forming composite structures, it would be advantageous to have a further improved process for the production of complex composite structures to narrow tolerances that have sufficiently high fiber volumes to be used as primary structures on aircraft or marine vessels.

SUMMARY OF THE INVENTION

The present invention addresses the above needs and achieves other advantages by providing a resin infusion mold tool system with vacuum assisted resin transfer molding that uses a subsequent pressure bleed to achieve high fiber volume fractions on complex composite structures. The mold tool system includes tooling having machined details that are positioned under a vacuum bag. Positioning of the machined details under the vacuum bag establishes a hard interface between the inner tooling and dry fiber perform. The hard interface allows for the formation of critical features within tight tolerances as the composite structure is being formed. In addition, the fiber volume fraction of the composite structure is increased from 54% to 57% or greater by the use of an additional bleed step in an autoclave.

In one embodiment, the present invention includes a mold assembly for distributing a resin throughout a dry fiber preform to form a composite structure. The mold assembly comprises an outer mold line tool which supports the dry fiber preform. An inner mold line tool is disposed on the dry fiber preform to form a hard interface between the inner mold line tool and a portion of the dry fiber preform. A vacuum bag encapsulates the inner mold line tool and forms an air-tight seal around the hard interface. A resin supply is connected in fluid communication with the dry fiber preform and supplies resin to the hard interface. A vacuum supply is connected in fluid communication with the mold assembly, supplies vacuum pressure to the hard interface and draws excess resin away from the hard interface such that the composite structure is tightly toleranced at the hard interface after curing.

In another aspect, the mold details on the inner mold line tool are positioned at the hard interface to imprint the mold detail onto the composite structure. An external locating fixture rigidly fixed to the inner mold line tool through an opening in the vacuum bag positions the mold line tool within a tight tolerance of ±0.015 inches or less. A mounting seal seals the opening in the vacuum bag against leakage of air when the vacuum is applied.

In another embodiment, a method for vacuum assisted resin transfer molding includes forming the resin transfer assembly by positioning the dry fiber preform on the outer tool. The inner tool is positioned on a portion of the dry fiber preform and sealed in the vacuum bag. The external locating fixture is attached through a hole in the vacuum bag to the inner tool thereby positioning the inner tool within a tight tolerance. The hole in the bag is sealed against airflow with the mounting seal. The resin transform assembly is then positioned in an autoclave. A resin inlet line and a resin outlet line are attached to the resin transfer assembly. The resin inlet line supplies liquid resin to the dry fiber preform. The resin outlet line is vacuum pressurized to bleed resin out of the fiber preform. The resin inlet line is detached and the autoclave door is shut. The autoclave is pressurized which bleeds additional resin out of the fiber preform resulting in a fiber volume fraction of 57% or greater.

The mold tool system and pressure bleed method of the present invention has several advantages. Large and complex fiber composite structures can be manufactured as a single piece, representing a significant cost and labor savings. The composite structure produced has a high fiber volume fraction allowing the large structures to be used in applications that experience large loads, such as airplane wings or marine structures. The hard tooling interface produces details and positions structural elements within relatively tight tolerances that are unavailable in conventional systems that use soft tooling.

BRIEF DESCRIPTION OF THE DRAWINGS

Figure 1:
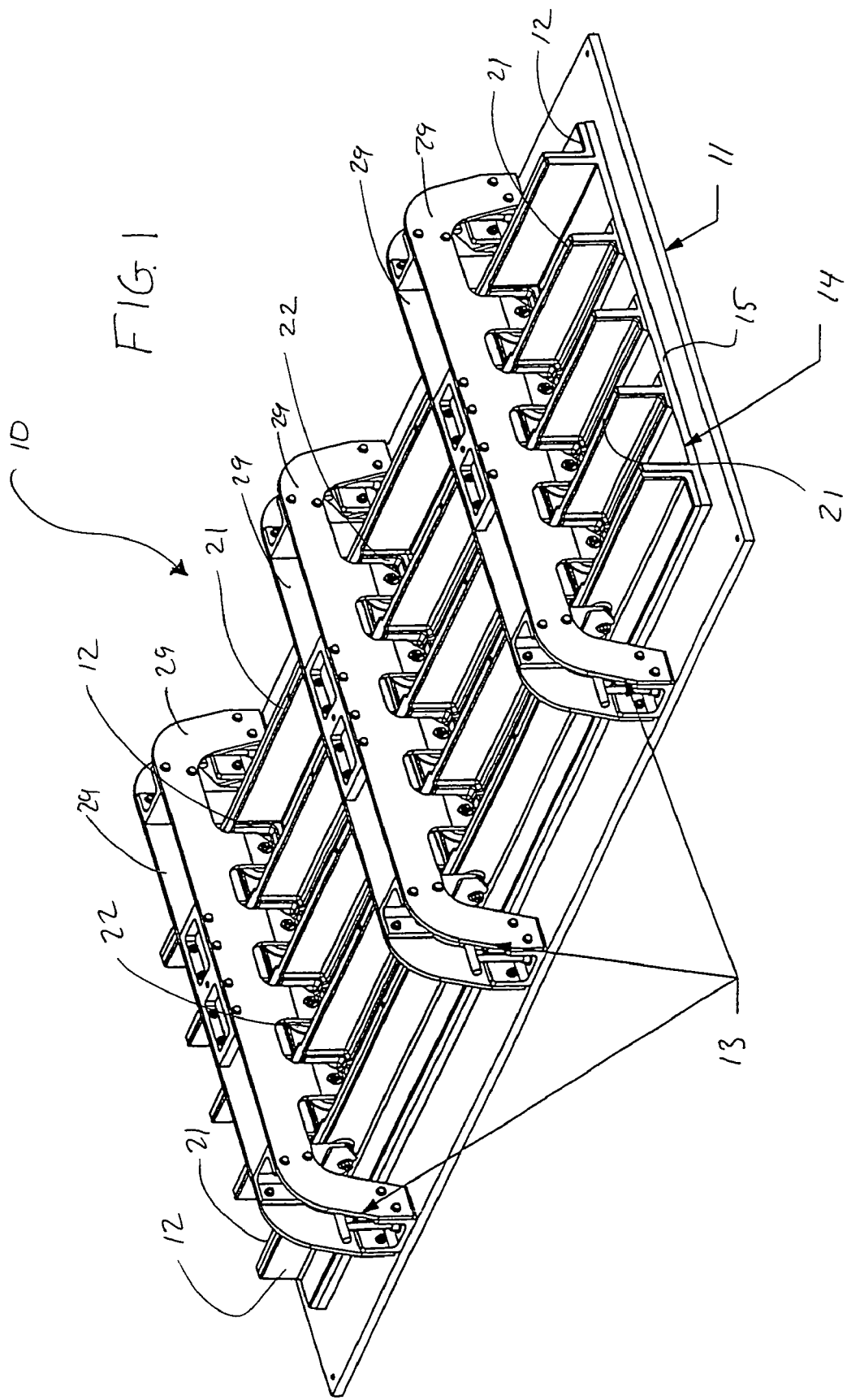
Figure 2:
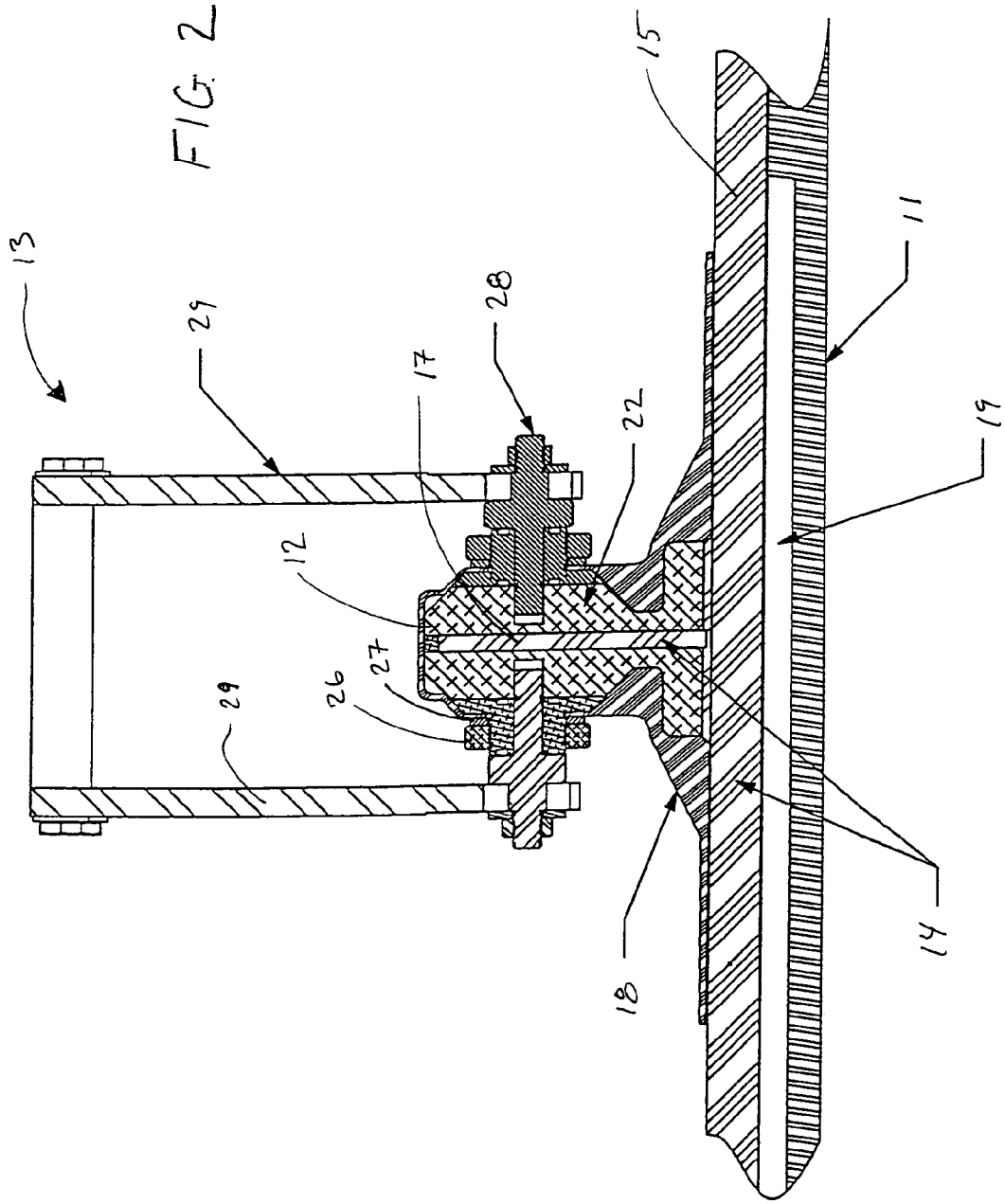
Figure 3:
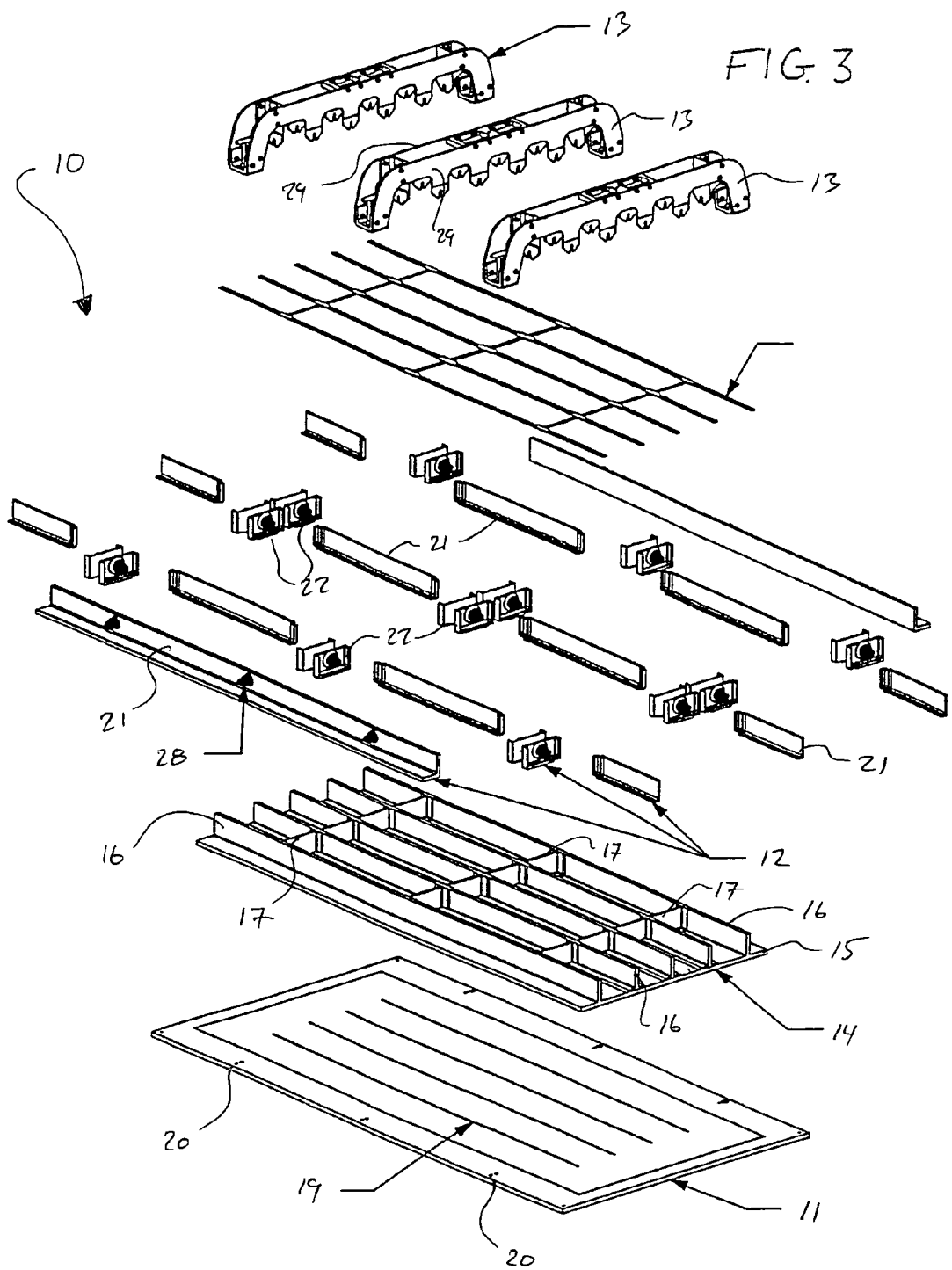

Having thus described the invention in general terms, reference will now be made to the accompanying drawings, which are not necessarily drawn to scale, and wherein:

FIG. 1 is a perspective view of a mold tool assembly of one embodiment of the present invention;

FIG. 2 is a cross-sectional view of an inner mold line tool, of the mold tool assembly shown in FIG. 1, covered by a vacuum bag;

FIG. 3 is an exploded view of the mold tool assembly shown in FIG. 1; and FIG. 4 is a schematic of pressure bleed of the mold tool assembly of FIG. 1 in an autoclave.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention allows for the construction of large fiber composite structures with inner mold lines having tight tolerances and intricate detailing by using hard tooling. In addition, the present invention uses a post bleed step in an autoclave to increase the fiber volume of the completed composite structure, lending the structure sufficient strength for use in the primary structures of aircraft, marine applications and the like.

FIG. 1 depicts a perspective view of a vacuum assisted resin transfer mold (VARTM) assembly 10 for use with a post bleed step in an autoclave 23. The assembly 10 includes a first, or outer, mold line tool 11, a plurality of second, or inner, mold line tools 12, and an external locating fixture 13. FIG. 3 depicts an exploded perspective view of the assembly 10 showing a complex dry fiber preform 14 having a rectangular base 15 that serves as an outer mold line and also having an integrally stiffened inner mold line. The inner mold line of the dry fiber preform 14 comprises a plurality of stringers 16 extending lengthwise along the rectangular base 15 interconnected by a plurality of intercoastals 17.

Assembled, the dry fiber preform 14 is disposed over a plurality of resin channels 19 on the surface of the outer mold line tool. The inner mold line tools 12 are disposed on the stringers 16 and the intercoastals 17. The assembly 10 is placed in an autoclave 23 with an open door, as shown in FIG. 4. The inner mold line tools 12 are encapsulated in a vacuum bag 18 and a plurality of vacuum lines 24 are attached in fluid communication with the vacuum bag. A plurality of resin supply lines 25 are attached in fluid communication with the resin channels 19 of the outer mold line tool 11. The resin supply line 25 supplies resin to the channels 19 which, along with the pressure differential between the resin source (inlet lines) and the resin exit lines, (vacuum lines), distributes the resin into the dry fiber preform 14. This pressure differential is created by exposing the resin source (inlet lines) to atmospheric pressure and pulling a vacuum on the resin exit lines and subsequent mold tool cavity/part assembly. Once the dry fiber preform is filled with resin, the resin inlet line is then detached, the autoclave door is shut and the autoclave is pressurized to bleed additional resin out of the fiber preform 14.

The outer mold line tool 11 is a rectangular plate with the resin channels 19 machined, cut or preformed into the upper surface of the tool on which the dry fiber preform 14 rests during resin impregnation. The outer mold line tool 11 preferably has dimensions (length and width) sufficient to support the entire dry fiber preform 14. The resin channels 19 extend along the length of the outer tool 11 and in a parallel, spaced relationship in order to access the dry fiber preform 14 at several locations. As depicted in the cross-section of FIG. 2, each resin channel 19 has a sufficient depth to allow the free flow of resin along the bottom of, and into, the dry fiber preform 14. Resin can be injected at one end of the resin channel, and the resin channel 19 is preferably high enough that the resin reaches the other end of the channel. Alternatively, resin can be injected at both ends of the channel, or at other points along the channel.

The outer mold line tool further defines a plurality of fixation holes 20 along its outer periphery and evenly spaced across the dry fiber preform for the rigid fixation of the external locating fixtures 13. The outer mold line tool 11 is preferably constructed of aluminum to provide light weight and rigidity. However, the outer mold line tool may be constructed of other materials such as other metals and polymers that can withstand the heat and pressure of the autoclave process.

The inner mold line tools 12 include a set of stringer molds 21 and intercoastal clip molds 22. Mold details can be on one, or both, sides of each stringer. The stringer molds 21 are on both sides of each stringer and define channels sized to cover the stringers 16 of the dry preform 14 once assembled. The channel shape of each stringer mold 21 is split longitudinally to allow assembly onto the stringers 16 with subsequent attachment of the external locating fixture 13. The clip molds 22 are similarly constructed, but shorter in length to span the distances between the stringers 16 and to cover the intercoastals 17. Preferably, the mold line tools are hard tooling, constructed of a material such as aluminum that forms a hard interface with the portions of the dry fiber preform 14. The hard interface results from direct contact of the hard inner tooling 12 with the preform 14 and, in cooperation with the external locating fixtures 13, allows for tight tolerances and details to be maintained during formation of the composite structure under pressure. If desired, a peel-ply (not shown), or other intervening layer, may be interposed between the mold line tools 12 and the dry fiber preform when tight tolerances are not as crucial. The peel ply facilitates removal of resin flash on the outer mold line surface of the composite structure after cure.

The vacuum bag 18 is preferably constructed of silicone rubber and is sealed around its periphery to enclose the inner mold line tools 12 using tape (not shown), glue or other sealant if desired. Sealing the inner mold line tools 12 inside the vacuum bag 18 avoids softening the hard interface between the tools and the dry fiber preform 14 and affecting the ability of the tooling to hold a tight tolerance during resin infusion.

Although the inner mold line tools 12 are enclosed inside the vacuum bag 18, the external locating fixtures 13 are located outside the bag, as shown best in FIG. 2. A through-the-bag attachment of the fixtures 13 to the tools 12 is accomplished through the use of a mounting seal assembly that includes a flanged insert 26, and a rubber vacuum bag interface 27 mounted on a bolt and washer assembly 28. The bolt and washer assembly preferably rigidly secures the external locating fixture 13 to the stringer molds 21 and the intercoastal clip molds 22 of the inner mold line tools 12. The bolt assembly 28 enters through a hole defined by the bag 18, passing through the flanged insert 26 and the rubber interface 27. The flanged insert 26 and rubber interface 27 are pressed together around the part of the bag 18 that defines the periphery of the hole by tightening of a nut on the bolt assembly 28 which forms an air-tight seal around the hole in the bag. The mounting seal assembly is used at every point where the bolt assembly 28 breaches the vacuum bag 18. The flanged inserts 26 allow the location of a detail or plurality of details (i.e., the stringer molds and intercoastal clip molds) through the soft vacuum bag 18 while maintaining vacuum integrity of the bag at pressures up to 100 psi.

The assembly 10 includes three external locating fixtures 13, one for each row of intercoastals 17. The external locating fixture 13 comprises a frame with a pair of spaced walls 29 that extend downward onto opposing sides of the intercoastal clip molds 22 and along each intercoastal row 17. The spaced walls 29 are notched to allow clearance for the tops of each stringer mold 21, as shown in FIG. 1. A pair of the bolt assemblies 28 connect the opposite sides of each of the intercoastal clip molds 22, securing the intercoastal clip molds to the pair of spaced walls 29 of the external locating fixtures 13. Each of the outside pair of stringer molds 21 are secured to the three external locating fixtures 13 through a set of three bolt assemblies 28 located near the ends of the external locating fixtures. The inner three stringer molds 21 are secured by the interdigitation of the secured intercoastal clip molds 22 amongst the stringer molds 21. As mentioned above, each of the external locating fixtures 13 is secured at its ends to the outer mold line tool 11 using pairs of the fixation holes 20. Note that fixation of the fixtures 13 to the outer mold line tool 11 does not require the use of the flanged inserts 26 or rubber interface 27 because these connections are not through-the-bag connections. The external locating fixtures 13 and the hard inner mold line tools 12 precisely locate the molding details to within ±0.015 inches, or even ±0.010 inches, on large and complex composite structures.

The vacuum assisted resin transfer molding process is initiated by positioning the dry fiber perform 14 over the resin channels 19 of the outer mold line tool 11. If desired, the peel ply is placed between the surface of the outer mold line tool 11 and the dry fiber perform 14. The inner mold line tools 12 are inserted into the dry fiber perform 14 and the vacuum bag is placed over this assembly. The locating fixture 13 is secured to the outer mold line tool 11 and the vacuum bagged inner mold line tools 12. The outer mold line tool 11, inner mold line tools 12, the locating fixture 13 and the dry fiber perform 14 are then positioned inside the autoclave 23.

The autoclaving step of the VARTM pressure bleed process is shown schematically by FIG. 4. The autoclave 23 includes a cylindrical container having a wall 30 sealed closed for pressurization using a door 31. The resin transfer assembly 10 is placed inside the autoclave 23. The vacuum lines 24 are attached to locations in the vacuum bag 18 as known to those of skill in the art and, for example, as described in U.S. Pat. No. 4,902,215 to Seemann, III and U.S. Pat. No. 4,942,013 to Palmer et al. The vacuum lines 24 pass through the autoclave wall 30 and are connected to an accumulator tank (pressure pot) 33 which is connected to a vacuum pressure source (not shown). The first ends of the resin supply lines 25 are placed inside a container of liquid resin 32 exposed to atmospheric pressure and the other ends of the supply lines are attached to ports 34 in the outer mold line tool 11 that feed the resin channels 19.

With the autoclave door 31 slightly cracked open, the autoclave is used like an oven to heat up the resin transfer assembly 10. Heating up the assembly optimizes the viscosity of the resin for infusion into the dry fiber preform 14. A vacuum is pulled on the vacuum lines 24 creating a pressure differential which forces the resin out of the resin container 32 and into the inlet supply lines 25. The resin, which is now evenly distributed over the outer mold surface, flows through the thickness of the dry fiber preform 14 and exits out the vacuum lines 24 attached to the vacuum bag 18. The resin flows out of the vacuum lines 24 and into the accumulator tank 33 where it is collected. As the tanks fill up, the collected resin is either periodically dumped by hand or automatically recycled back to the resin container 32 via a transfer pump (not shown). The continuous flow of resin through the part is maintained until the assembly 10 is completely filled with resin.

Once the preform is filled with resin, the vacuum is reduced to stagnate resin flow, the resin supply lines 25 are closed off and the autoclave door 31 is then closed and locked. The autoclave 23 is then pressurized, squeezing the now resin-impregnated fiber preform 14 to bleed off the excess resin through the vacuum lines 24. The vacuum lines 24 are then closed off and the pressure inside the autoclave 23 is increased further. Preferably, the pressure ranges between 0 and 100 psi of autoclave pressure. The temperature inside the autoclave is then increased to cure out the fiber panel 14 resulting in a composite structure that has a much higher fiber volume fraction of 59% versus 54% for conventional processes. The assembly 10 is removed from the autoclave 23 and the vacuum bag 18 and inner mold line tools 12 are subsequently removed from the completed composite structure. The peel ply can also be removed, taking with it flashing material remaining after the pressure bleed step. In the illustrated embodiment, the VARTM pressure bleed process results in an integrally stiffened panel that is 2.28 meters long and 0.9 meters wide, although panels or parts having other shapes and sizes can be similarly fabricated.

Many modifications and other embodiments of the invention will come to mind to one skilled in the art to which this invention pertains having the benefit of the teachings presented in the foregoing descriptions and the associated drawings. For instance, in lieu of a supply of liquid resin, a resin film could be disposed on the dry fiber preform and heated to distribute the resin throughout the preform. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of vacuum assisted resin transfer molding, comprising:
   forming a resin transfer assembly by positioning a dry fiber preform on a tool, positioning a second tool on a portion of the dry fiber perform, sealing at least a portion of the dry fiber preform and the second tool in a vacuum bag, rigidly fixing an external locating fixture to the second tool through a hole in the vacuum bag and positioning the second tool within a tight tolerance;
   positioning the resin transfer assembly in an autoclave;
   infusing the resin into the dry fiber perform through a resin inlet line;
   vacuum pressurizing a resin outlet line and bleeding resin out of the fiber preform concurrent with pressurizing the resin inlet line;
   detaching the resin inlet line; and
   pressurizing the autoclave and bleeding additional resin out of the fiber preform.

2. The method of claim 1, further comprising the step of attaching the resin inlet line and the resin outlet line to the resin transfer assembly before pressurizing the inlet and outlet lines.

3. The method of claim 1, wherein said steps of pressurizing the inlet and outlet lines result in a fiber volume fraction of at least 53% in the fiber preform.

4. The method of claim 3, wherein said step of pressurizing the autoclave results in a fiber volume fraction of at least 57% in the fiber preform.

5. The method of claim 1, wherein said step of forming a resin transfer assembly further includes sealing the hole in the vacuum bag against airflow with a mounting seal.

6. The method of claim 1, wherein said step of positioning the second tool within the tight tolerance includes positioning the tool within ±0.015 inches or less.

7. The method of claim 1, wherein said step of forming a resin transfer assembly further includes positioning a mold detail on the second mold line tool at a hard interface between the second mold line tool and the portion of the dry fiber preform.

8. The method of claim 1, wherein said pressurizing the autoclave step includes drawing away the additional resin bled from the fiber preform through the resin outlet line.

9. A method of manufacturing a resin-impregnated composite, comprising:
   encapsulating a dry fiber preform within a fluid-impermeable container, wherein encapsulating the dry fiber perform comprises positioning the dry fiber preform on a tool, positioning a second tool on a portion of the dry fiber perform, sealing at least a portion of the dry fiber preform and the second tool in a vacuum bag, rigidly fixing an external locating fixture to the second tool through a hole in the vacuum bag and positioning the second tool within a tight tolerance;
   supplying a resin to the fluid-impermeable container and infusing the dry fiber preform with the resin;
   providing an outlet from the fluid-impermeable container; and
   applying an external pressure to an external surface of the fluid-impermeable container resulting in an internal pressure increase within the fluid-impermeable container wherein the internal pressure increase is attributable to, and in proportion to, the external pressure increase, said internal pressure increase urging the resin out of the preform and fluid-impermeable container and increasing a fiber-volume fraction of the resin-impregnated composite.

10. A method of claim 9, wherein applying the external pressure includes applying an external pressure up to a peak of 100 psi.

11. A method of claim 9, wherein supplying the resin includes connecting the fluid-impermeable container to a resin supply and wherein infusing the preform includes supplying a vacuum to the fluid-impermeable container.

12. A method of claim 11, wherein the fiber-volume fraction of the composite is 57% or greater.

* * * * *